United States Patent
Kiknadze et al.

[11] Patent Number: 6,119,987
[45] Date of Patent: Sep. 19, 2000

[54] METHOD AND APPARATUS FOR CONTROLLING THE BOUNDARY OR WALL LAYER OF A CONTINUOUS MEDIUM

[75] Inventors: Gennady Iraklevich Kiknadze; Ivan Alexandrovich Gachechiladze, both of Moskow; Valery Grigorievich Oleinikov, Mytischi, all of Russian Federation

[73] Assignee: Nikolaus Vida, Germany

[21] Appl. No.: 08/983,479

[22] PCT Filed: Jul. 19, 1996

[86] PCT No.: PCT/EP96/03200

§ 371 Date: Mar. 16, 1998

§ 102(e) Date: Mar. 16, 1998

[87] PCT Pub. No.: WO97/04280

PCT Pub. Date: Feb. 6, 1997

[30] Foreign Application Priority Data

Jul. 19, 1995 [DE] Germany .......................... 95 11 337

[51] Int. Cl.[7] .................................................. B64C 21/08
[52] U.S. Cl. ........................ 244/204; 244/207; 244/208; 244/130
[58] Field of Search ...................................... 244/199–206, 244/207, 208, 209, 130

[56] References Cited

U.S. PATENT DOCUMENTS

| | | | |
|---|---|---|---|
| 4,932,612 | 6/1990 | Blackwelder et al. | 244/200 |
| 5,346,745 | 9/1994 | Bandyopadhyay . | |
| 5,362,179 | 11/1994 | Sirovich et al. | 244/204 |
| 5,386,955 | 2/1995 | Savill | 244/200 |

FOREIGN PATENT DOCUMENTS

| | | | |
|---|---|---|---|
| 1346271 | 12/1963 | France . | |
| 2113897 | 6/1972 | France | F28F 13/00 |
| 32 28 939 | 11/1983 | Germany | F15D 1/12 |
| 2263525 | 7/1993 | United Kingdom | B63B 1/34 |
| WO 92/14981 | 9/1992 | WIPO | F28F 13/02 |
| WO 94/00342 | 1/1994 | WIPO | B64C 21/00 |

*Primary Examiner*—Galen L. Barefoot

[57] ABSTRACT

The present invention relates to the field of aerohydrodynamics and heat and mass transfer and especially relates to a method and an apparatus for controlling the boundary layer or the wall layer of a continuous medium consisting of gases, liquids and/or their mixtures in the vicinity of a surface (1) for changing the flow structure, turbulence level, transfer of the impulse, transfer of heat and/or admixtures by influencing of the flow and changing of the velocities of the continuous medium particles.

12 Claims, 6 Drawing Sheets

METHOD AND APPARATUS FOR CONTROLLING THE BOUNDARY OR WALL LAYER OF A CONTINUOUS MEDIUM

DESCRIPTION

Field of the Invention

The present invention relates to the field of aerohydrodynamics and heat and mass transfer; in particular it relates to problems of controlling the wall or boundary layers of continuous media gases and/or liquids, which move with regard to heated or isothermal freely streamlined surfaces and surfaces of pressure and/or energy transfer channels, the said surfaces being heated by the said continuous media and especially relates to a method according to the preamble of claim 1 and an apparatus according to the preamble of claim 8.

It is well known that just the boundary or wall layers are one of the main sources of the aerohydrodynamic resistance, when a flow runs past a surface, see f.i. Schlichting G. "Theory of Boundary Layer", Moscow, NAUKA Publishing House, 1974, pp. 712, as well as the factor that determines the thermal resistance in the transfer of heat from the heated surface to the flow core or from the heated flow to the surface, past which the flow runs.

In 1904 L. Prandtl suggested a method, see e.g. Prandtl L., Titiens O."Hydro- and Aerodynamic.IIV. 1,2. M., ONTI, 1935 for controlling the boundary layer by sucking off the moving medium particles, decelerating in the flow wall layer. The essence of this method is well known and it is used for practical purposes in the case of laminar and turbulent flows.

The majority of the results obtained in heat and mass transfer intensification by means of the so-called two-dimensional artificial surface roughness method may be characterized by the possibility of a an increase, by 1.5 to 3 times, of the heat transfer in channels of practically any geometrical shapes. And to achieve such an intensification of the heat transfer it is required that the absolute height of the roughness elements is from 0.02 to 0.03 of the equivalent diameter of the channels in the case when the two-dimensional projections are of a triangular or rectangular shape or if they are made in the form of wire wound around the streamlined surface. The appropriate depth for two-dimensional cross grooves on a cylindrical streamlined surface is from 0.03 to 0.05 of the equivalent hydraulic diameter of the channel. The heat and mass transfer intensification method by means of the two-dimensional artificial surface roughness is effective for the transient and developed turbulent modes of flow of the heat carrier. However, the use of this method involves an essential increase of the hydraulic resistance, which exceeds 4 to 10 times that of a smooth channel. This strong increase of the hydraulic resistance is the main cause, which restrains the use of the two-dimensional artificial surface roughness method for the intensification of the heat transfer in energy transfer devices.

GB 2 263 525 A discloses a flow control arrangement for incorporation in the surface of a body subject to fluid flow comprising an array of magnetohydrodynamic actuators to impose a force on an electrically conductive fluid in a direction parallel to the surface to produce a predetermined boundary layer condition. WO-A-94/00342 is concerned with an apparatus and a method for controlling a boundary layer in a flow of a fluid having a predetermined electrical conductivity and moving relative to a surface, wherein the apparatus comprises a conductivity altering means, a magnetic field generating means and a electric current generating means.

The authors of the EP-A-85 107 484.9. "Heat Transfer Tube for Single Phase Flow", claimed a heat exchange tube which is provided with at least one row of projections (concavities) on the inner surface of the said tube along a spiral curve, while the contour of the cross section of these projections consists of smooth curves in any part of the height of the projections, including the base. In this case the cross section area monotonously decreases in the direction towards the projection apex, whereas the projection height is from 0.45 to 0.6 mm. The spiral curve is selected so that the pitch of the variant (circumferential pitch, azimuthal pitch) along the circumference" is 3.5 to 5 mm and that along the axis is 5 to 15 mm. However, the authors of that Patent do not indicate the relation between the dimensions of the projections and pitches, which characterize the location of the projections, and the diameter of the tube and the heat carrier flow conditions. Besides, the authors also do not indicate any radii of the curves of the sections, at which the smooth portions of the tube surface are conjugated with the surface of the projection.

At the same time it is known from Kahnin E. K., Draitser G. A., Yarko S. A. "Intensification of Heat Transfer in Channels", Moscow, MACHINOSTROYENIE Publ. House, 1981, pp. 206 that these curve radii determine the hydraulic resistance value and, hence, the heat and physical effectiveness.

In the PCT/RU 92 00 106 which publication is incorporated here by reference a streamlined surface containing very specially shaped dimples is defined by means of a detailed equation filling at least one and a half printed page of the application documents. In this equation at least eight different variables are mentioned for defining a static surface shape, especially no hint is given for a dependence of the streaming medium on a velocity thereof.

It is an object of the present invention to provide a method and an apparatus for providing control of the boundary layer or the wall layer of a continuous medium comprising gases, liquids and/or mixtures thereof, for changing the flow structure, the turbulence level, the transfer of the impulse, the transfer of heat and/or admixtures in said layers which method is simply to apply and which apparatus is adapted to take advantage of a reduced hydraulic resistance, an increased heat and impulse transfer and may accordingly be used in a huge variety of technical applications.

A further object of the invention is to avoid any complicated explicitly defined surface shapes but to give a very easy and basic teaching about the generation of secondary tornado-like vortices.

Furthermore, it has to be noted that the inventors have found a very fundamental solution for the generation of secondary tornado-like vortices as function of the speed of the streaming medium, which solution may be realized by a plurality of different physical forces and influences, whereas the subclaims mainly are specifying a collection of preferred embodiments. The fundamental solution is directed to the flow structure itself, especially to the generation of secondary tornado-like vortices having a nonzero helicity v·rot(v) ≠0 and, consequently, in the broad sense of the underlying technical teaching the invention shall not be limited by any distinct device or preferred embodiment.

Moreover, a complete teaching how to obtain this flow structure under the influence of different physical entities is given belowstanding in more detail.

BRIEF DESCRIPTION OF THE DRAWINGS

The invention together with several preferred embodiments will be better understood from the belowstanding detailed description in conjunction with the attached drawings wherein it is shown in:

FIGS. 10a and 10b: a cross-sectional view of the layout of the membranes.

DETAILED DESCRIPTION OF THE PREFERRED EMBODIMENTS

Figure 1B:
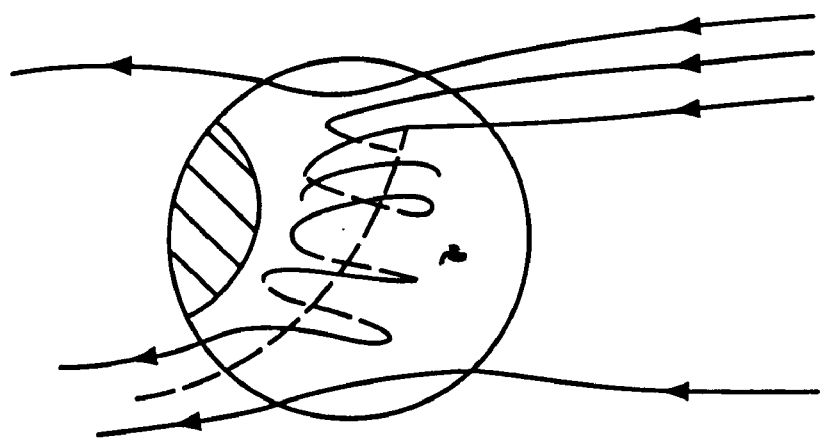
FIG. 1b: a photography of an asymmetric vortex structure within the turbulent regime of the flow.

Throughout the belowstanding discussion bold typed letters are indicating vectors, whereas underlined values are the average values of the respective physical entity. Furthermore, the following definitions are given for the sake of clarity and for a better understanding of the underlying inventive concepts.
Definitions of important Expressions:

Surface (1) in the inventive embodiments may be the inner or the outer surface of any closed or opened vessel, especially the inner surface of any pipe or container surrounding flowing gases, liquids and/or their mixtures or any of the outer surfaces of a plane, ship or automotive vehicle.

Particles in the inventive embodiments may be the elementary (small) volumes (parts, portions) of the continuous medium flow or may be solid particles streaming within the gases, liquids and/or their mixtures.

Near-wall flow of the continuous medium is the flow of the continuous medium in direct neighbourhood (nearness) of the streamlined wall (surface).

Wall region is a spatial region near the surface (1) in which the flow of the continuous medium is influenced by the presence of the surface (1).

Boundary layer thickness $\delta$ is a distance along the normal from the streamlined wall surface whereby on said distance the flow velocity reaches the value 0.99 of the external potential flow velocity (reference is made to the work of Schlichting G. "Theory of Boundary Layer", Moscow, NAUKA Publishing House, 1974, pp. 712 which publication is incorporated herein by reference).

Equivalent hydraulic diameter of the Pressure channel is the ratio of quadruple channel cross section area to the perimeter of said cross section, see also Schlichting G. "Theory of Boundary Layer", Moscow, NAUKA Publishing House, 1974, pp. 712.

Characteristic hydraulic dimension of the near-wall flow is the distance in the wall region corresponding to the essential change of flow velocity.

Average distance S along the normal from the streamlined wall to the curved trajectory of the particle is the half sum of the minimum and maximum distances along the normal from the wall to the particle moving along the curved trajectory.
Underlying Physical Aspects Forming an important aspect of the present invention is the problem of the development of a method and an apparatus for controlling the hydraulic resistance, heat and mass transfer processes, boiling, deposition of admixtures in the boundary or wall layers of the flows of gases, liquids or their two-phase and multicomponent mixtures moving at preferably no pressure or in pressure channels by initiating the formation of largescale vortex structures and by directing their development due to various power influences: pressure forces, originating due to deformation (static or nonstationary) of the surface, past which the flow runs, electric and magnetic fields of alternating directions concentrated in the wall zone of the flow, injection of the continuous medium and its sucking off.

The set task is solved by influencing the continuous medium flow with a field of forces at least in the wall region of the flow within a range of distances yn along the normal from the streamlined surface, the said range being from 0.005 to 0.3 of the thickness $\delta$ of the boundary layer, or equivalent hydraulic diameter of the pressure channel, or characteristic hydraulic dimension of the wall flow; the said influence is used to cause the velocity vectors of the continuous medium particles to turn alternately in space and/or in time through angles $\alpha$=0.02 to 0.5 radian with regard to the streamlined surface and away from this surface, as well as through angles $\beta$=0.02 to 0.3 radian to the left and right with regard to the direction of motion of the wall flow of the continuous medium, and in this case the intensity of the influence is such that the minimum curvature radius $R_{min}$ of the trajectories of the continuous medium particles, which are under the influence of the field of forces within the range of the indicated distances from the wall, is from 2 to 30 average distances S along the normal from the streamlined wall to the curved trajectory of the particle, whereas the spatial repetition of the influence is $\lambda_\parallel$=(3 to 30) yn along the direction of the wall flow and $\lambda_\perp$=(1 to 10) yn across the direction of the wall flow, the repetition time T being from 3 to 30 distances yn, divided by the average velocity v in the boundary or wall layers, and this provides for the formation of secondary tornado-like vortex flows that create the structure of the boundary or wall layer, determining the level of intensity, of transfer of the impulse, heat and admixtures.

The set problem can also be solved by correlating the repeated influences on the wall flow in time inside the flow region by size $L_\parallel$=(15 to 150)yn along the direction of the wall flow and by size $L_\perp$=(5 to 50) yn across the wall layer. As it is known, the state of the boundary layer or wall layer of the continuous medium is characterized by a velocity field $\underline{v}$ in these layers, by Reynolds stresses $v'_i v'_j$, turbulent flows of the admixture $v'_i c'$ and heat $v_i'T$ where, as usual $\underline{v}$ is the velocity vector averaged by some time interval, $v_i'$ is the pulsation of the i velocity component, c', T'—are the pulsations of the admixture and heat, accordingly, the underlining of the products of the pulsation values indicates averaging in time. The dynamics of values $v'_i$, $v'_i v'_j$, $v_j'T'$, $(v_j' c')$ is described by the appropriate equations, which determine the variation of these values along the lines, which are tangent to the averaged velocity field, for more details see: Belov I. A., Kudryavtsev N. A. "Heat Transfer and Resistance of Tube Banks". Leningrad, ENERGOATOMIZDAT Publishing House, Leningrad Department, 1987, P. 223; the contents of this publication is incorporated by reference. The main terms in these equations, i.e. terms which predict the direction of the variation of values $v_i'v_j'$, $v_i'T'$, are the so-called Reynolds stresses and heat flux generation terms, expressed by the product of these values and the derivatives of the averaged velocity with respect to the coordinates. The turn of the averaged velocity vector involves in this way a change of the Reynolds stresses and heat flux generation terms. The smaller the curvature radii of the continuous medium particle trajectory, the greater the said terms, whereas their summary influence on the variation of values $vi'v_j'$, $v_i'T'$, is proportional to the turn angles of the average velocity vector.

In the case when the averaged velocity vectors turn toward the streamlined surface, this, as a rule, involves a decrease of the pulse and heat transfer from the flowing continuous medium to the surface, past which the flow runs, whereas when the said vectors turn from the surface, past which the flow runs, the pulse and heat transfer increases. Turns of the velocity vectors to the left or to the right with regard to the direction of the wall flow involve a transfer of the pulse across the said flow and perpendicular with regard to the normal to the surface, past which the flow runs.

The turns of the velocity vectors have an influence on the shift of the averaged velocity, i.e. on the derivatives of the absolute averaged velocity value with regard to the directions, which are perpendicular to the averaged velocity vectors. The changed Reynolds stresses also involve changes of the derivatives of the velocity components with regard to the coordinates. These factors, along with the extension of the tubes of flow under conditions of a three-dimensional change of the averaged velocity, result in the formation of various vortex structures, including tornado-like ones. The vortex structures in their turn influence the transfer of the pulse, heat and admixtures.

The distance yn from the wall, within which the field of forces exercises its influence on the continuous medium flow and which involves turns of the continuous medium particle velocity vectors, corresponds to the zone of formation and transformation of coherent large-scale structures, which play an important role in the wall turbulence mechanism. At a turbulent flow of the continuous medium this distance is normally enclosed within the range from 0.005 to 0.3 times the thickness δ of the boundary layer, or equivalent hydraulic diameter of the pressure channel, or characteristic hydraulic dimension of the wall flow.

Control of the continuous medium boundary or wall layer is also achieved by repeated influences on the wall flow correlated in time. The trace of the influence on the wall flow has an extension of the hydrodynamic length scale to approx. 20 yn. In this case a nonmonotonous behaviour of the turbulent flows of the pulse, heat or admixtures may be observed in the trace region, depending on the kind and intensity of the initial influence. Correlation of the repeated influences on the wall flow permits an increase of the desired effects of a single influence on the flow and a decrease of the undesired effects.

The Influence on the flow

The influence on the flow may be exercised by a magnetic field alternating in space and/or in time or jointly by a magnetic field and an electric field, concentrated in the wall region within a range of distances yn=(0.005–0.3)δ.

The influence on the flow may be accomplished by the shape of the streamlined surface alternating as deformable membranes, which are held at the circumference thereof, in space and/or in time, whereby pressure gradients are generated, which undergo changes in value and direction.

The flow may be influenced by blowing the continuous medium in and by sucking it off alternately in space and/or in time in various sections of the surface, past which the flow runs.

For a better understanding of the essence of the invention it is recommended to refer to the attached drawings.

Figure 3:
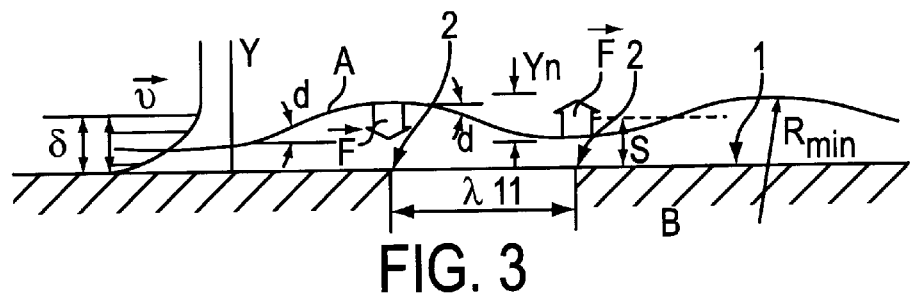
FIG. 3: a cross section extending through a plane defined by the average velocity vector and the normal to the surface in a first, more general inventive embodiment showing also the spatial repetition of the influence along the wall flow direction $\lambda_\parallel$.

Given in FIG. 3 is the diagrammatic representation of the wall flow region with an indication of the velocity profile of $\underline{v}$, the trajectory A of the continuous medium particle, the range of distances yn from the wall, around which the flow runs, the boundary layer thickness δ or characteristic hydraulic dimension of the wall flow, angles of turns of the continuous medium particle velocity vectors a towards the streamlined surface B and from it away under the influence of a field of forces F, the average distance S from the streamlined wall to the curved trajectory A of the particle, the minimum curvature radius $R_{min}$, of trajectory A of the continuous medium particle, the spatial repetition of the influence along the wall flow direction $\lambda_\|$.

Figure 4:
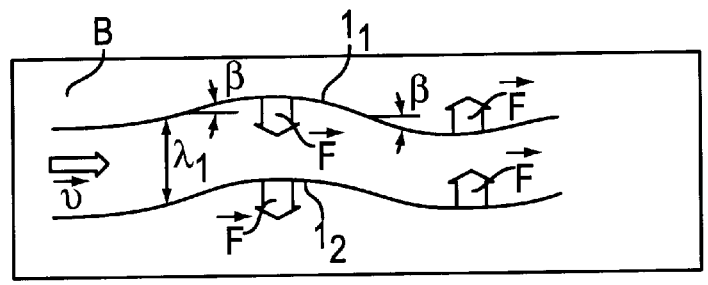
FIG. 4: an elevated view on the surface and the sources of FIG. 3.
Figure 5:
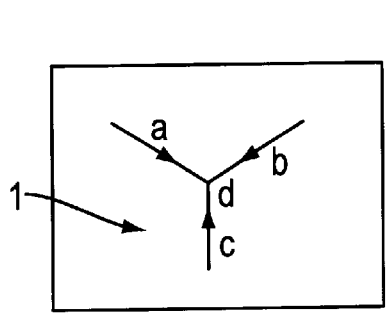
FIGS. 5 to 8: drawings of conductors for the generation of electric and magnetic fields in the vicinity of the surface.
Figure 6:
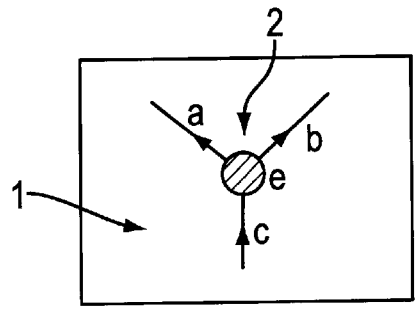

FIG. 4 shows the diagrammatic representation of two trajectories A1 and A2 of the continuous medium particles in the projection on streamlined surface B with an indication of the turn angles β of the continuous medium particle velocity vectors to the left and to the right with regard to the wall flow direction $\underline{v}$ under the influence of the field of forces F, and spatial repetition of the influence across the direction of wall flow $\lambda_\|$.

Shown in FIGS. 9, 10, 10a and 10b are the diagrammatic representations of regions C of streamlined surface B, the shape of which alternates in space and/or in time. The surfaces C may be including elastic membranes which are sealedly held at the circumference thereof and energized by a pressure transmitting fluid on the other side of the surface 1. The pressure of the fluid may be controlled for all of the membranes or separately by means well known for a person skilled in the art.

Figure 11:
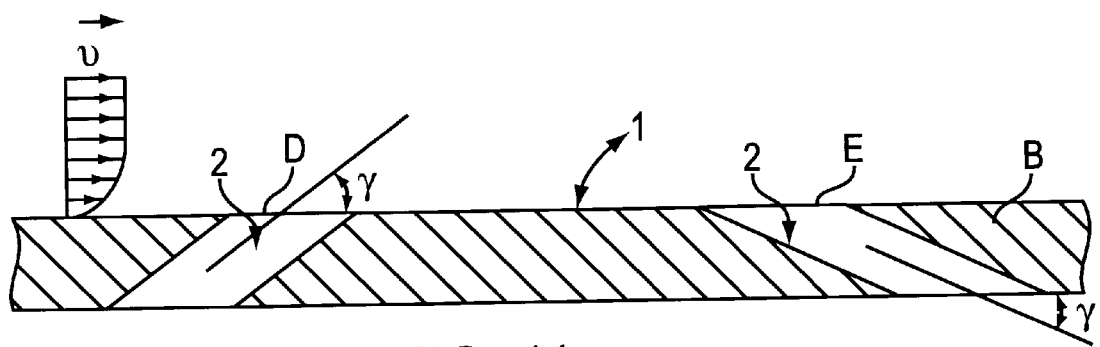
FIG. 11: a cross section through a surface containing as source of influence through holes for injecting and sucking off of parts of the flowing medium.

Given in FIG. 11 is the diagrammatic representation of streamlined surface B with holes D for blowing in of the continuous medium and holes E for sucking off this medium.

It has to be mentioned that the method of controlling the boundary or wall layer of the continuous medium may be realized in the following way. As it is shown in FIGS. 3 and 4 the continuous medium flow is influenced by the field of forces F at least in its wall region within a range of distances yn along the normal from the streamlined surface B, this range being from 0.005 to 0.3 of the boundary layer thickness δ, or equivalent hydraulic diameter of the pressure channel, or characteristic hydraulic dimension of the wall flow; by means of such an influence the vectors of continuous medium particle velocities are caused to turn alternately in space and/or in time through angles α=0.02 to 0.5 radian to the streamlined surface or from it and through angles β=0.02 to 0.3 radian to the left or to the right with regard to the direction of the wall flow v or $\underline{v}$ of the continuous medium, and in this case the influence intensity is such that the minimum curvature radius $R_{min}$, of trajectory A of the continuous medium particles, which are under the influence of the field of forces F within the range of the indicated distances from the wall is from 2 to 30 average distances S along the normal from the streamlined surface B to the particle curved trajectory A, whereas the spatial repetition of the influence is $\lambda\|=(3 \text{ to } 30) \text{yn}$ along the direction of flow, $\lambda\bot=(1 \text{ to } 10)$ yn across the direction of flow, time repetition T is from 3 to 30 distances yn divided by the average velocity $\underline{v}$ in the boundary or wall layers, and this provides for the formation of secondary tornado-like vortex flows, which form the structure of the boundary or wall layer, and this structure determines the level of turbulence, transfer of the pulse, heat and admixtures. The created three-dimensional tornado-like structures are characterized by the nonzero helicity $v \cdot \text{rot } v \approx 0$.

In accordance with the modern knowledge, the vortex flow regions with the nonzero helicity, such as, for example, tornado-like structures, lead to the effects of the anomalous energy transfer along the turbulence spectrum, to the negative turbulent viscosity and to the disturbance of the Reynolds analogy in the direction of the heat transfer. So tornado-like vortex flows control and form the boundary or wall flow structure and create the helicity turbulence.

The flow is influenced by means of devices, the diagrammatic representations of which are given in FIGS. 5 to 11. To this end, an electric current is passed via conductors a, b, c, d, e, f, g (FIGS. 5 to 8), and electric potentials are applied to them (in particular to conductor h). In this case the current, passing through the conductors, creates a magnetic field, which influences the wall flow due to the electric current, which is induced in the wall layer of the continuous medium, including the influence due to the difference of the electric potentials. The originating force $F=\sigma[E \times B+B \times (B \times v)]$ involves a turn of the continuous medium particle velocity vectors in accordance with the above-described method. The electric current conductors may have various configurations, in particular, they may be of the linear or area nature. In this case at least one of the dimensions of the conductors is from 0.005 to 0.3 $\delta$.

The flow is influenced by concavities and/or convexities c of this or that shape (FIGS. 9, 10, 10a and 10b), and in this case the depth (height) of the concavity (convexity) is from 0.005 to 0.3 $\delta$, the minimum curvature radius $R_{min}$ of the concavity (convexity) in its main part is from 0.1 to 1.0 $\delta$.

Figure 7:
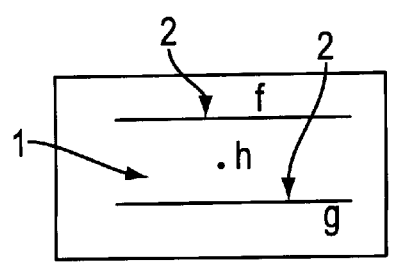
Figure 8:
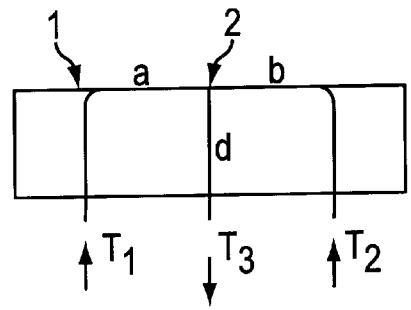
Figure 9:
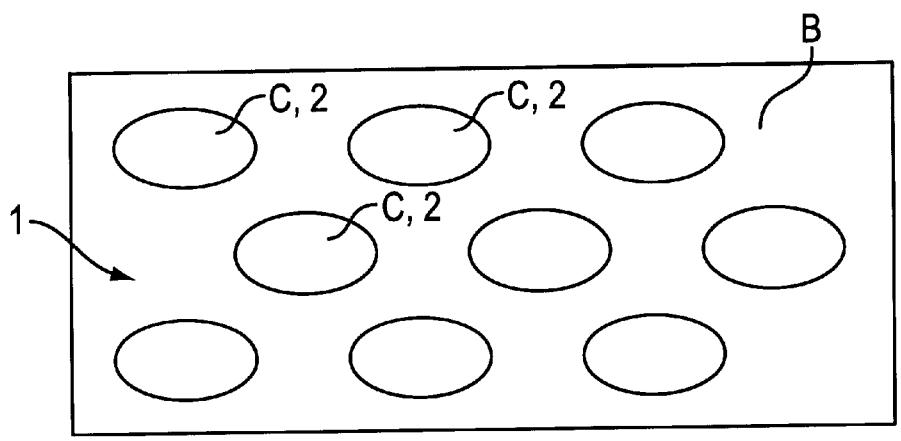
FIGS. 9 and 10: elevational views on the surface containing as sources of influence deformable surface elements comprising membranes.
Figure 10:
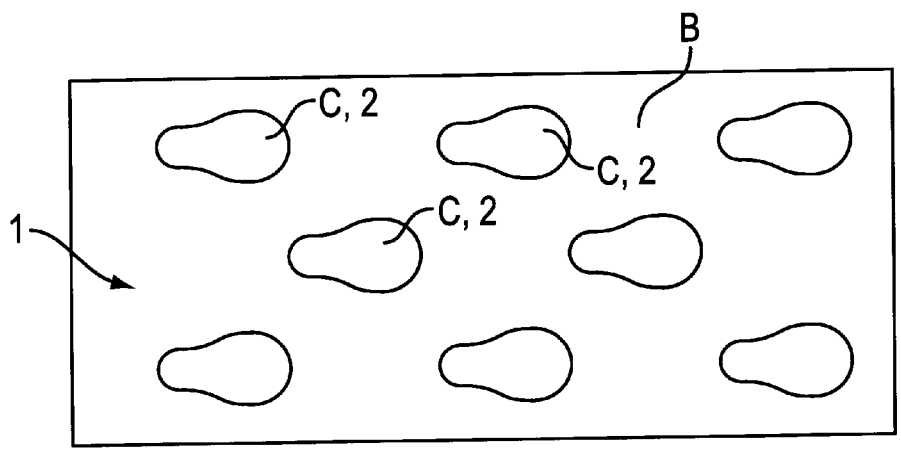

The influence on the flows accomplished by movable membranes secured at the perimeters of holes of this or that shape (the diagrammatic representation of membrane C is shown in FIGS. 7 and 8). In the given case the diameter of the holes is from 0.01 to 0.6 $\delta$, whereas the displacement of the central part of the membrane is from 0.005 to 0.3 $\delta$.

The influence is accomplished by blowing the continuous medium in the holes and by sucking it off through the holes. In this case the hole diameter is from 0.005 to 0.1 $\delta$, and the holes are arranged at a pitch of 2 to 10 hole diameters, whereas the velocity vector of the blown in or sucked off continuous medium forms an angle to the streamlined surface equal to a value of 0.1 to 1.0 radian.

The operation of the devices, provided with concavities, convexities, membranes, blowing in and sucking off holes, is obvious. As the flow runs past the concavities, convexities, membranes, holes, a field of pressure gradients is formed and there gradients cause the vectors of the continuous medium particle velocities to turn in the wall region of the flow in accordance with the above-described method.

To practice the inventive method and to realize the inventive apparatus it is possible to use the above mentioned different physical effects and, furthermore, a very simple trial and error technique to test and optimize the conditions as defined in detail in the claims.

For a given surface the velocity vectors of the flow should be measured, which is known for a person skilled in the art, and may be performed by well known techniques as f.i. laser anemometry, measuring of heat exchange, visual recording of particles located within the flow, and many others.

Figure 1A:
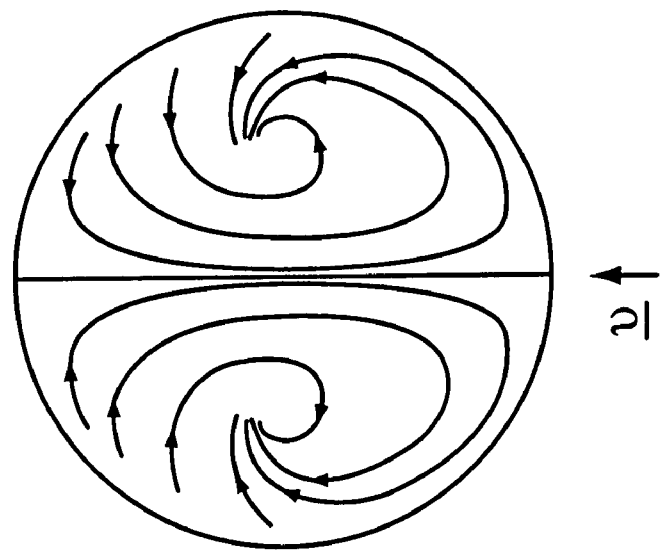
FIG. 1: the generation of a vortex by flow running past a single dimple, especially it is shown in FIG. 1a: a photography and a drawing of a symmetric vortex structure within the laminar regime of the flow.
FIG. 1c: a drawing of the vortex structure depicted in FIG. 1b, FIG. 2: the visualization of a flow structure of flow running past a lattice of dimples.

At first a source 2 of influence should be located in the vicinity of or in the surface 1; and testing of the flow structure provides information of the directional change of the velocity vector v, i.e. also of the average velocity vector $\underline{v}$, and is providing information about the distribution of angles of the velocity of the flow in the direction of the normal and in a plane extending parallel to the surface, see f.i. FIGS. 1a to 1b.

Based on the obtained results the intensity of the employed fields, i.e. the strength of the induced forces or the depth of deformation, may be amended, essentially in view of a distribution in the direction of the normal to the surface 1.

Based on the measured lateral distribution of flow velocity vectors essentially the lateral dimensions of the first source 2 the influence may be adapted to the claimed definitions.

Figure 2:
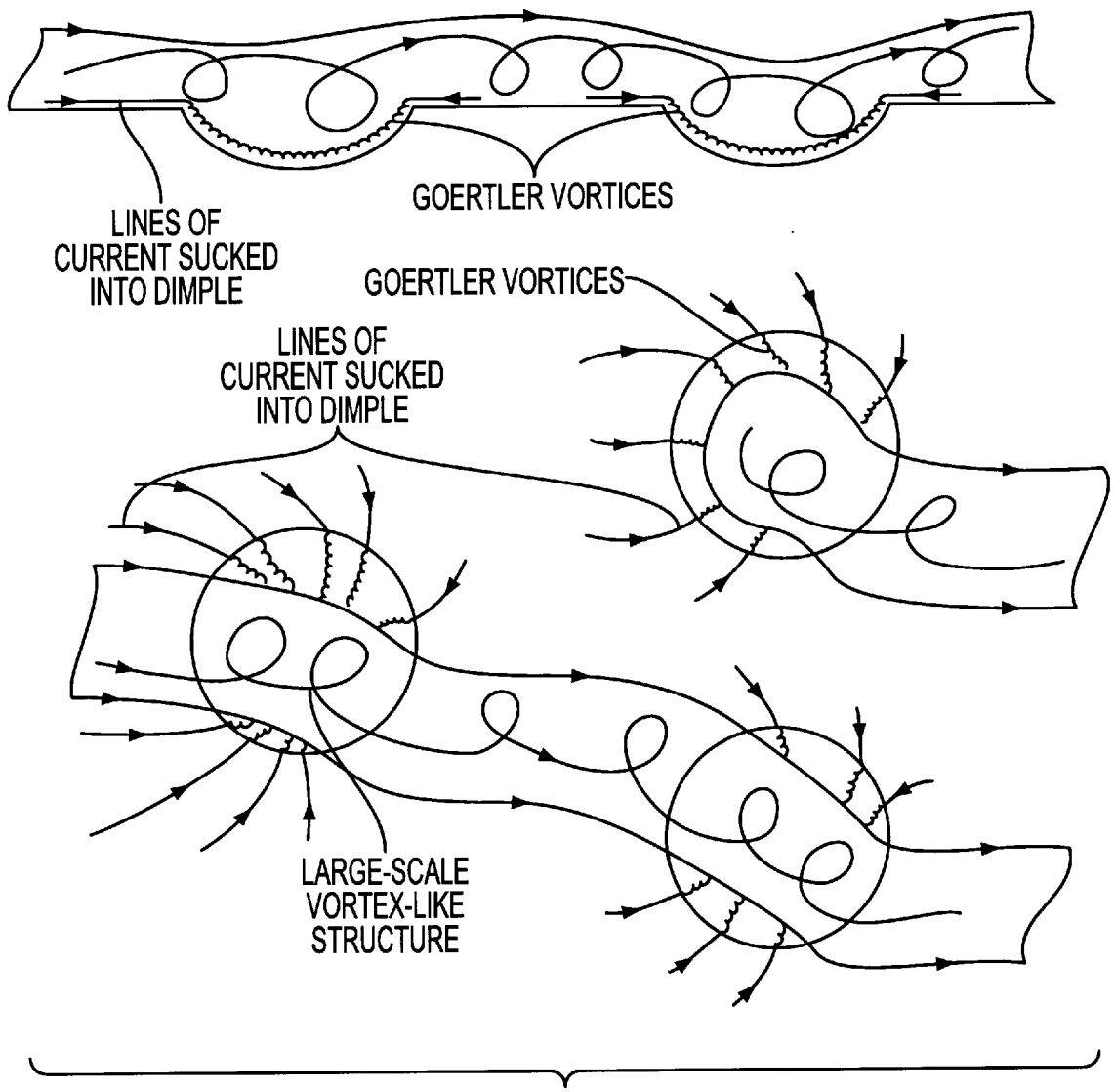

After optimization of the first source 2 the second and further sources may be located at a distance as defined in the claims. Thus a grid of adapted sources may be obtained stepwise for substantially any surfaces of any shape and for basically all technically relevant devices, see e.g. FIG. 2 for an embodiment of such a grid. Additionally, the sources 2 may be randomly or statistically distributed within the defined ranges specified in the claims.

It is obvious, f.i. in case of the body of a ship, in case of the wing of a plane or a body of a vehicle, that there are different local velocities at different places. Consequently, the resulting positions of the sources 2 will vary in accordance.

For closed vessels a transparent prototype model may be used to obtain the above results within the vessel itself.

Furthermore, it is lying within the scope of the invention not only to use a field of sources 2 which are placed at the respective distances for the respective as described above, but to use a very a dense field of sources 2, e.g. magnetic coils, electric potential plates, surface deformations by membranes, and/or ports for injecting and sucking off, which are not all energized at the same time. By omitting the energization of the respective misplaced sources 2 it is possible to control the local influence also for different velocities, respectively.

Further inventive embodiments are based on a computerized control system employed e.g. at the body of a ship controlling the injection and suction of cooling water in adapted regions, which body of said ship also may have further adapted electrodes or surface deformations.

At the outer surface of a plane entrance and outlet ports may be used as sources of influence which are connected with the several distinct pressure stages of the turbines and may be employed separately or in combination with adapted surface deformations.

Figure 12:
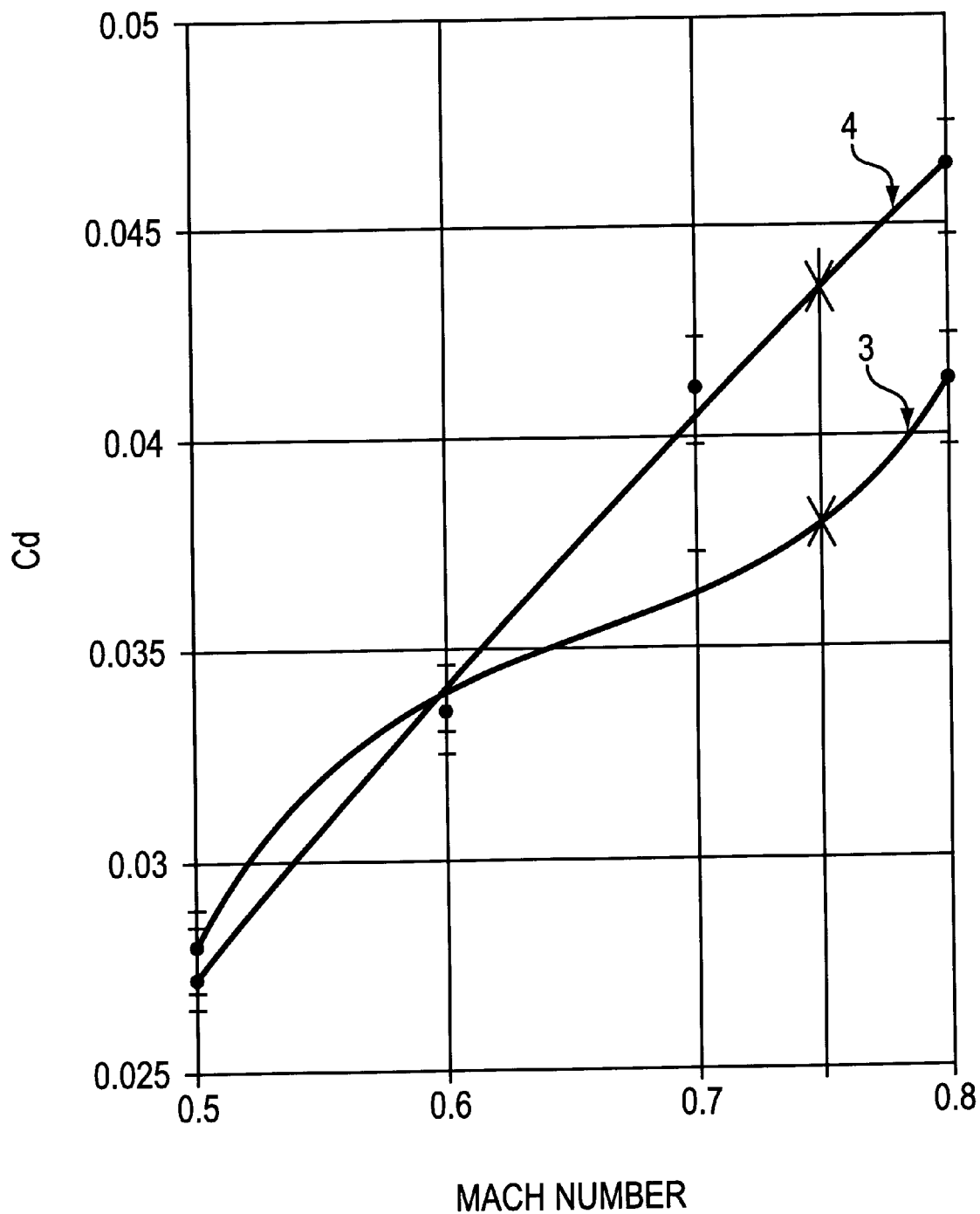
FIG. 12: the hydraulic resistance measured as cd-coefficient of an inventive surface 3 in comparison to a prior art surface 4 as function of the speed of the streaming medium.
Figure 13:
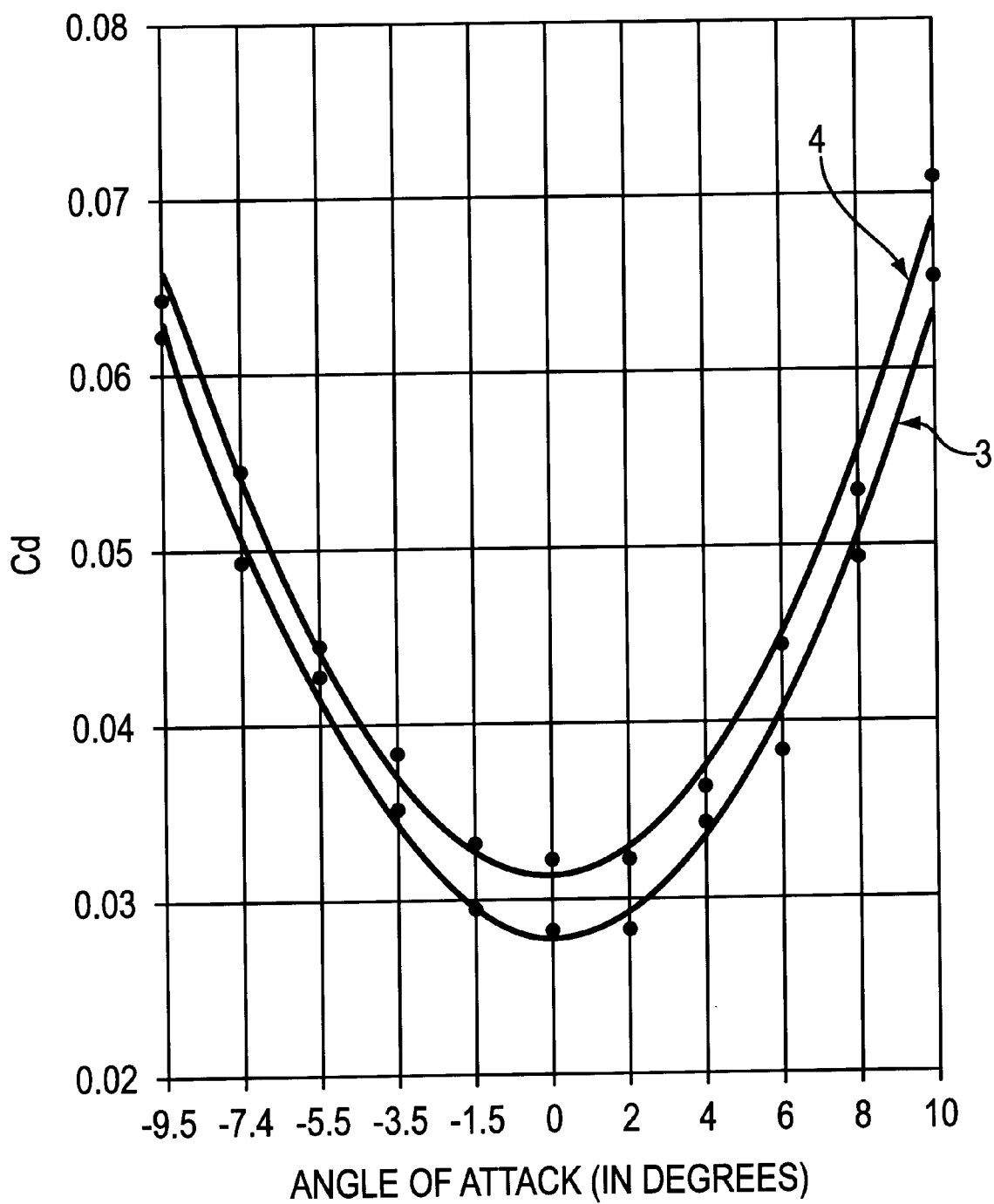
FIG. 13: the hydraulic resistance measured as cd-coefficient of the surfaces of FIG. 12 as function of the tilt angle of the surface relative to the streaming medium.

Some results for a special inventive embodiment may be seen from FIGS. 12 and 13. FIG. 12 shows the cd-coefficient (essentially a measure for the hydraulic resitance) of an inventive surface as function of the speed of the streaming medium in comparison to a prior art surface. Both surfaces were introduced into a wind tunnel and the cd-coefficient was measured as commonly known to a person skilled in the art. The inventive surface was containing spherical indentations, i.e. concavities having a maximum depth relative to the plane surface of about 0.5 mm, a radius of about 4.5 mm and a longitudinal spacing, i.e. a spacing in streaming direction, of about 2.0 mm between the edges of the indentations. Several rows of indetations were placed beneath each other in a staggered array with a spacing of the rows relative to each other of coarsely about 9.5 mm. The speed of the streaming medium, which medium in this case was air, is given as mach number. For 0.75 Mach it can be seen that the hydraulic resistance of curve 4 for the plane prior art surface is more than about 15% higher than the resistance of curve 3, i.e. the hydraulic resistance of the inventive surface.

To show the influence of a tilt angle on the inventive effect the inventive surface and the prior art surface were tilted relative to the speed of the streaming medium. As expected the lowest resistance, i.e. lowest cd-coefficient was obtained for a tilt angle of zero degrees which is the same case as shown in FIG. 12 where the medium was streaming essentially parallel to the surfaces. It clearly may be seen that the inventive reduction of the hydraulic resistance is effective for a wide range of tilt angles which tilt angles also may be called the angles of attack.

We claim:

1. Method for controlling the boundary layer or the wall layer of a continuous medium comprising gases, liquids and/or their mixtures in the vicinity of a surface (1) for changing the flow structure, turbulence level, transfer of the impulse, transfer of heat or admixtures by influencing the flow and changing of velocities of continuous medium particles and causing formation of tornado-like vortex flow wherein a continuous medium flow is influenced by a field of forces at least in its wall region within a range of distances yn along the normal from the surface (1), a turn of the velocity vectors of the continuous medium particles is caused repeatedly in space or in time by said influence of said forces, said influence causes said turn in a range of angles $\alpha$ alternately towards the surface (1) and from it away and in a range of angles $\beta$ alternately to the left and to the right with regard to the direction of the velocity vectors of the continuous medium particles of the near-wall flow, characterized in that said range yn being from 0.005 to 0.3 times the boundary layer thickness $\delta$, or the equivalent hydraulic diameter of the pressure channel, or the characteristic hydraulic dimension of the near-wall flow;

said angle $\alpha$ being between $\alpha$=0.02 and 0.5 radian;

said angle $\beta$ being between $\beta$=0.02 and 0.3 radian;

the intensity of said influence or the strength of said forces is such that the minimum curvature radius $R_{min}$, of the trajectory of the flow of said particles is from 2 to 30 average distances S along the normal from the streamlined wall to the curved trajectory of the particle, whereas at least one of the following features a) and b) is valid:

a) the spatial repetition of said influence being $\lambda_\parallel$=(3 to 30) yn along the direction of the wall flow and $\lambda_\perp$=(1 to 10) yn perpendicular to the direction of the wall flow, b) the time repetition T being from 3 to 30 times the distances yn divided by the average velocity $\underline{v}$ in the boundary or wall layers.

2. Method as claimed in claim 1, characterized in that said tornado-like vortex flows are secondary tornado-like vortex flows having a nonzero helicity v·rot(v)≉0.

3. Method as claimed in claim 1, characterized in that at least a part of said influence on the wall flow is accomplished by a magnetic field, alternating in space or in time, said field being concentrated in the wall region.

4. Method according to claim 1, characterized in that at least a part of said influence on the wall layer is accomplished jointly by a magnetic field, and an electric field alternating in space or in time, said fields being concentrated in the wall region.

5. Method as claimed in claim 1, characterized in that at least a part of said influence on the flow is accomplished by the shape of said surface (1) varying in at least one of space and time, and generating pressure gradients within the flowing continuous medium varying in value and direction.

6. Method as set forth in claim 1, characterized in that at least a part of said influence on the near-wall flow is accomplished by simultaneous injecting and sucking off of an amount of the continuous medium at a plurality of locations at said surface (1), said injection and suction varying in space and/or in time.

7. Method as set forth in claim 1, characterized in that at least a part of said influence on the near-wall flow is accomplished by a combination of simultaneous injecting and sucking off of an amount of the continuous medium at a plurality of locations at said surface (1), by the shape of said surface (1) varying in space or in time, causing pressure gradients within the flowing continuous medium varying in value and direction.

8. Apparatus for providing control of the boundary layer or the wall layer of a continuous medium comprising gases, liquids and/or mixtures thereof, for changing the flow structure, the turbulence level, the transfer of the impulse, the transfer of heat or admixtures in said layers by influencing the flow and changing the velocity vectors of the continuous medium particles, comprising a surface (1) and sources (2) of influence on the flow of a continuous medium (3), said influence comprising a field of forces the continuous medium flow being influenced by said field of forces at least in its near-wall region within a range of distances yn along the normal from the surface (1), characterized in that said apparatus is constructed such that said range yn being from 0.005 to 0.3 times the boundary layer thickness 6, or equivalent hydraulic diameter of the pressure channel, or characteristic hydraulic dimension of the wall flow, a turn of the velocity vectors of the continuous medium particles being caused repeatedly in space or in time by said influence, said influence causing said turn in a range of angles $\alpha$0.02 to 0.5 radian alternately towards the surface (1) and from it away and in a range of angles $\beta$=0.02 to 0.3 radian alternately to the left and to the right with regard to the direction of the velocity vectors of the continuous medium particles of the near-wall flow of the continuous medium, and the intensity of said influence is such that the minimum curvature radius $R_{min}$ of the trajectory of the flow of said particles is from 2 to 30 average distances S along the normal from the streamlined wall to the curved trajectory of the particle, whereas at least one of the following features a) and b) is valid a) the spatial repetition of said influence being $\lambda_\| = (3$ to $30)$ yn along the direction of the wall flow and $\lambda_\perp = (1$ to $10)$ yn perpendicular to the direction of the wall flow, b) the time repetition T being from 3 to 30 times the distances yn divided by the average velocity $\underline{v}$ in the boundary or wall layers, causing the formation of tornado-like vortex flows.

9. Apparatus according to claim 8, wherein said sources (2) of influence are made in the form of defined regions, which create magnetic or electric fields or are comprising surface deformation or are comprising locations for injecting and sucking off, said sources (2) of influence are comprising linear or area elements, respectively, and in case of surface deformations at least one of the deformations is having a thickness of 0.005 to 0.3 $\delta$ of the boundary layer, the equivalent hydraulic diameter of the pressure channel, or of the characteristic hydraulic dimension of the wall flow.

10. Apparatus according to claim 8, wherein said sources (2) are sources of influence on the surfaces in the form of concavities or convexities, the depth (height) of the concavities (convexities) having a thickness of 0.005 to 0.3 $\delta$ of the boundary layer, or of the equivalent hydraulic diameter of the pressure channel, or of the characteristic hydraulic dimension of the wall flow, whereas the minimum curvature radius $R_{min}$, of the concavity (convexity) is in its main portion from 0.1 to 1.0 $\delta$.

11. Apparatus according to claim 10, wherein said sources are comprising sources of influence on the flow in the form of holes with membranes secured along the perimeter of said holes, the diameter of the holes being from 0.01 to 0.6 times the thickness $\delta$ of the boundary layer, or of the equivalent hydraulic diameter of the pressure channel, or of the characteristic hydraulic dimension of the wall flow, whereas the displacement of the membrane central portion is ranging from 0.005 to 0.3 $\delta$.

12. Apparatus according to claim 8, wherein said sources of influence are designed in the form of holes, the diameter of which is from 0.005 to 0.1 thickness $\delta$ of the boundary layer, or equivalent hydraulic diameter of the pressure channel, or characteristic hydraulic dimension of the wall flow, said holes being located at a pitch of 2 to 10 hole diameters, and the velocity vector of the continuous medium, blown into a sucked out through said holes, is defining an angle of 0.1 to 1.0 radian to said surface.

* * * * *